(12) United States Patent
Shaarpour

(10) Patent No.: US 7,629,297 B2
(45) Date of Patent: Dec. 8, 2009

(54) LOST CIRCULATION COMPOSITION

(76) Inventor: Mano Shaarpour, 6200 Savoy Dr., #733, Houston, TX (US) 77036

( * ) Notice: Subject to any disclaimer, the term of this patent is extended or adjusted under 35 U.S.C. 154(b) by 223 days.

(21) Appl. No.: 11/115,729

(22) Filed: Apr. 26, 2005

(65) Prior Publication Data

US 2006/0237192 A1 Oct. 26, 2006

(51) Int. Cl.
*C09K 8/35* (2006.01)
*C09K 8/58* (2006.01)

(52) U.S. Cl. .............. 507/204; 507/213; 507/232; 507/269; 507/104; 507/110; 507/126

(58) Field of Classification Search ............ 507/269, 507/215, 213, 204; 175/72
See application file for complete search history.

(56) References Cited

U.S. PATENT DOCUMENTS

| | | | | |
|---|---|---|---|---|
| 4,289,632 | A | | 9/1981 | Clear |
| 5,004,553 | A | * | 4/1991 | House et al. ............ 507/100 |
| 5,826,669 | A | * | 10/1998 | Zaleski et al. ............ 175/72 |
| 6,630,429 | B1 | | 10/2003 | Cremeans et al. |
| 6,825,152 | B2 | * | 11/2004 | Green ........................ 507/104 |
| 6,861,392 | B2 | | 3/2005 | Shaarpour |
| 6,932,158 | B2 | * | 8/2005 | Burts, III .................. 166/295 |
| 2001/0036905 | A1 | * | 11/2001 | Parlar et al. ............... 507/200 |
| 2003/0186819 | A1 | * | 10/2003 | Shaarpour ................. 507/200 |

OTHER PUBLICATIONS

Pine, Organic Chemistry, 1980 p. 833.*

* cited by examiner

*Primary Examiner*—David Buttner
(74) *Attorney, Agent, or Firm*—Timothy F Mills

(57) ABSTRACT

A composition of matter and a method of sealing a permeable formation is provided incorporating the composition to reduce or eliminate lost circulation in permeable formations. The composition comprises one or more sealing components, ranging in size from approximately 10 to approximately 750 microns, a wetting component, a viscosifier component and an activator or flocculant. A dry mixture of the components may be added directly from the bag to the drilling mud to the permeable formation and will not set up inside the drill string. The mixture will seal the formation in an aqueous or organic environment, thus removing the need to form a pill in a slugging pit prior to introduction. The mixture dewaters at a rapid rate without regard to the time and temperature required for curing agents or other additives. The mixture does not require additional agents such as defoamers, accelerators, retarders or spacers to dewater and set as a solid plug.

4 Claims, 2 Drawing Sheets

FIGURE I
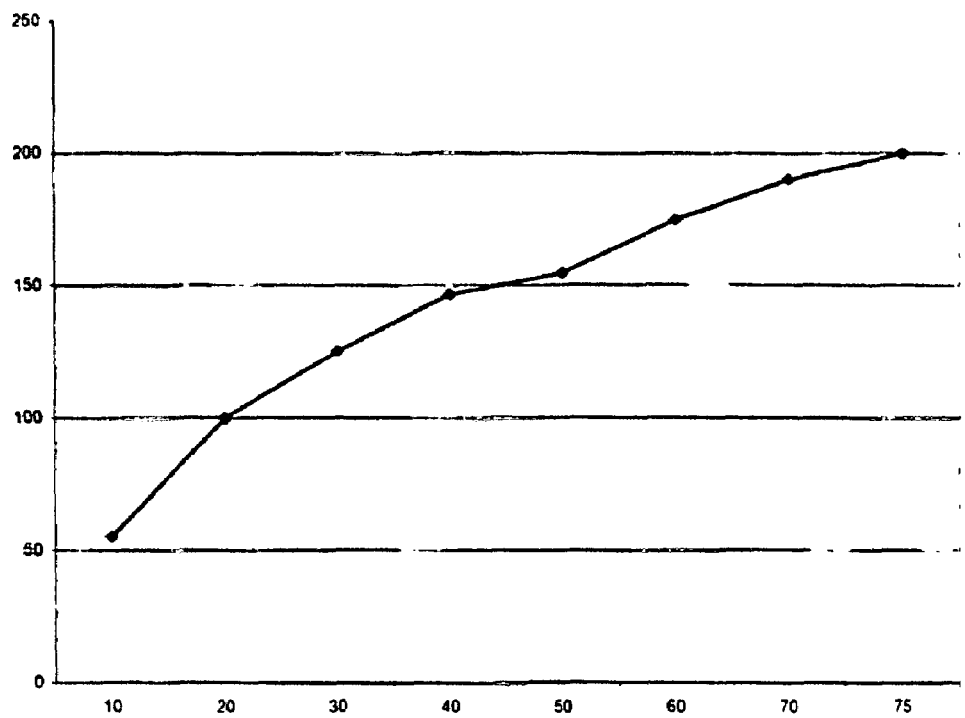
FIGURE 2
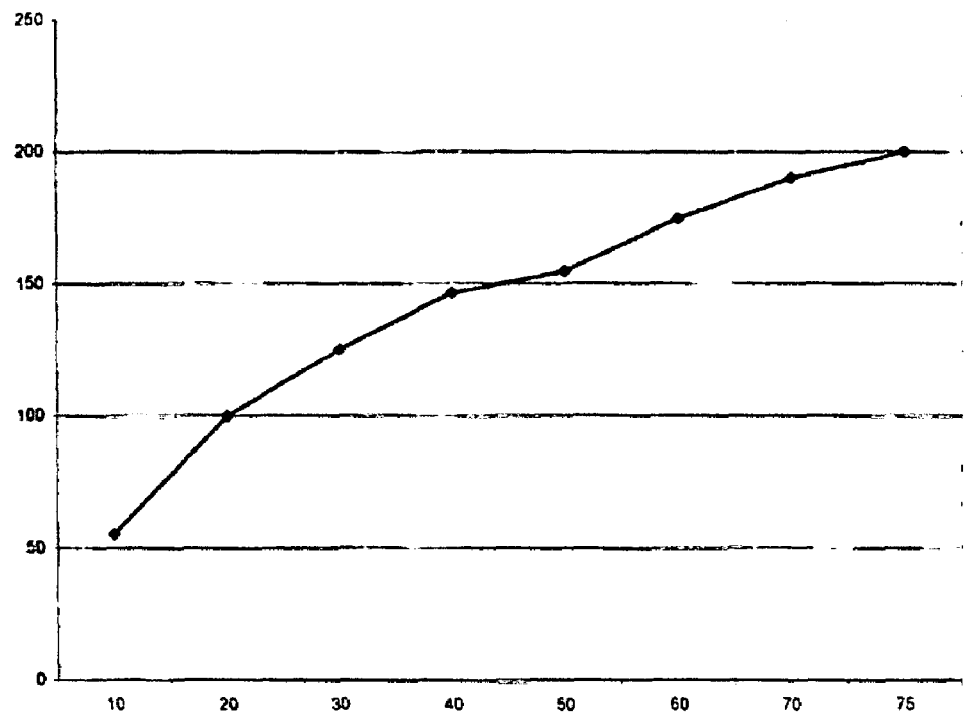

LOST CIRCULATION COMPOSITION

BACKGROUND OF THE INVENTION

The present invention relates generally to lost circulation remediation materials and methods, and more particularly to a composition of matter for sealing permeable formations encountered in the drilling of a well thus restoring lost circulation. In other aspects the invention relates to a composition that may be employed to reduce or stop leaks, stabilize soils and fill voids within environmental requirements.

Lost circulation in drilling oil, gas, water or geothermal wells refers generally to the quantities of drilling mud lost to an underground formation, usually a cavernous, pressured or coarsely permeable bed, but it could also be a zone containing microfractures or microfissures, evidenced by a partial or complete failure of the mud to return to the surface as it is being circulated through the drill string to the boring bit and back up the bore hole to the surface. Lost circulation zones are remediated generally by addition of bridging materials or sealing materials. Bridging materials generally comprise larger particulate sizes. Bridging materials are generally employed in cavernous or porous formations. Examples of bridging materials include but are not limited to angular carbon compounds, plant fibers such as nut shells, naturally occurring materials such as diatomaceous earth mined from ocean sediments, and calcium carbonate ground from marble. Sealing materials, on the other hand, are generally used to seal smaller fractures or fissures because they comprise particulates of generally smaller sizes. Examples of sealing materials include plant fibers such as wood flour and synthetic materials such as polymers. Bridging materials and/or sealing materials are generally placed in the loss zone in a mixture with base liquid known as a 'pill', or concentrate. Once in place, pressure is applied to force the materials into the formation. As the pressure is applied the LCM looses its liquid component, known as 'dewatering', even if the liquid component is substantially organic, to form a plug. If the plug is effective, circulation of the drilling mud is restored. Multiple applications of the same or different LCM may be required to restore circulation. The more effective the LCM, the more rapidly drilling can resume and the lower the cost of the drilling operation.

A third type of loss is known as seepage. Seepage is generally minor loss of drilling fluid in the thief zone after addition of LCM or anywhere along the bore hole. Generally drilling can continue when seepage occurs because of the minor loss of drilling fluid. LCMs of relatively small particulate size may be added directly to the regularly circulating drilling fluid to attenuate seepage losses.

The general purpose of drilling mud is to lubricate the expensive bit and drill string and remove the cuttings. Drilling mud is not normally formulated to bridge or seal lost circulation zones, thus additives may be required. Remediation material for lost circulation has been the subject of research and development almost since the inception of the industry. Advances in lost circulation remediation materials continues from a combination of ingenuity and science.

Numerous off-the-shelf, proprietary and patented LCMs are currently available to add to the well for delivery to the loss or thief zone but may prove deficient or inadequate in regard to cost, time required, and or effectiveness.

The lost circulation material disclosed in U.S. Pat. No. 4,289,632 claimed diatomaceous earth as a sealing agent and finely divided paper as a suspending agent. The novel aspect appeared to be the use of finely divided paper to suspend the diatomaceous earth. The inclusion of traditional bridging materials, such as nut shells was stated in the description but not claimed. Additional embodiments explained that the inclusion of lime could increase water loss, or dewatering, without affecting viscosity, and that weighting materials such as barite could be added without adverse effect. However, the necessity of a component to suspend the diatomaceous earth or other lost circulation material increases the cost of the LCM. In addition, paper swells rapidly in aqueous environments and is thus not an effective bridging agent.

U.S. Pat. No. 6,861,392 B2 states in claim 8 a pellet comprising a formation bridging component, a seepage loss component, an oil wetting component, and a modified hydrocarbon in one embodiment as the LCM, and that said components were well known to those skilled in the art. Additional embodiments were stated in claim 27 utilizing an angular carbon compound, in claim 36 with liquid lecithin as an oil wetting agent, in claim 37 with graphite, and in claim 38 with calcium carbonate. '392 states that the LCM requires 30-45 minutes of soaking time in water in a slugging pit before it may be placed down the hole by conventional means. Whereas the composition of the present invention does not utilize an angular hydrocarbon or modified hydrocarbon of '392 nor is a soaking time in aqueous or a slugging pit required. The angular hydrocarbon, usually a modified form of graphite, packs too tightly and is too resilient to dewater effectively. In addition, the expense and time required for soaking the LCM are significant limitations not encountered in the present invention.

U.S. Pat. No. 6,630,429 B1 claims an environmentally friendly LCM comprising cottonseed hulls, vegetable starch and preservative, with additions of wood fiber, polymer and surfactant in dependent claims. Additional embodiments in claims 5 and 8 comprise natural fiber, preservative and vegetable starch or surfactant. The summary states that the method of the invention comprises adding the dry pellet directly to the suction pit without the need for soaking or premixing, however this method is not claimed. Whereas the composition of the present invention is environmentally friendly and meets the requirements of LD50, but does not use the same components. In addition the present invention does not require the use of a preservative to retard spoilage, a definite limitation in some field applications.

The operator is always aware of the importance that the drilling system be as inexpensive as possible to minimize the cost of drilling the well. Alternative LCMs are continually being sought to reduce formulation requirements, well operator employee and equipment time, and increase effectiveness over the broadest range of thief zone formations. The present invention addresses these needs by providing an environmentally useful, rapid dewatering composition that leaves behind a solid dense plug, and methods of use, that is heat resistant, that does not require the curing time of a polymer additive, that mixes directly in any environment, i.e., water, seawater, hydrocarbon or synthetics, in water cuts of 0 to 100%. The present invention may be mixed externally in a slugging pit or introduced directly into the drilling mud. It does not require separate well additives such as defoamers, accelerators, retarders, suspenders or spacers thus increasing utility and decreasing overall cost of application.

A composition according to the present invention to reduce drilling fluid losses and/or seal permeable formations to restore lost circulation comprises bridging components and/or sealing components generally having a broad particle size distribution (PSD), wetting agent(s), viscosifier(s) and activator(s).

Broadly, the PSD comprises a range of approximately 10 to approximately 750 microns. The composition comprises by weight approximately 30% to approximately 95% of bridging and/or sealing components, from approximately 5% to approximately 25% of wetting component(s), from approximately 0.5% to approximately 4% viscosifier(s) and approximately 1% to approximately 8% of activator(s).

In order to provide the broad range of particulate sizes in one preferred embodiment more than one bridging component and/or more than one sealant component may be incorporated into the composition. An example would be including a powder such as diatomaceous earth, natural fibers such as fine wood flour and more coarse component, nut shell fibers. The end use of the product influences the number and types of sealing components incorporated. For example, nut shells are generally commercially available in at least fine, medium and coarse gradings. At large particulate size distributions, nut fibers are generally employed as bridging agents. In comparison, wood flour, also a commercial byproduct, is available in superfine gradings of at least approximately 10-15 microns. At this PSD, wood flour is employed generally as a sealing agent for microfissures and microfractures. In addition, the smaller particulates aggregate with the larger bridging agents to form a more effective plug.

Preferred wetting components comprise hydrophilic and organophilic properties to facilitate mixing in the broadest range of fluids comprising aqueous and non-aqueous environments. Wetting agents comprise generally natural products or synthetics. The presence of the wetting agent in combination with the other ingredients promotes the direct introduction of the composition into aqueous or organic base fluids, such as fresh water, seawater, saturated salt water, diesel, or synthetic organic base fluids, or a mixture of the two, from 0% to 100% water content, without premixing in a slugging pit if desired. Preferred wetting agents that exhibit said characteristics are collectively labeled herein as omnibase wetting agents, i.e., not limited to aqueous base fluids or synthetic base fluids. An example of available synthetic omnibase wetting agents are surfactants or other types of detergents. An example of a preferred natural product that acts as an omnibase wetting agent is gilsonite, a natural asphaltum that has hydrophilic and organophilic properties. Gilsonite acts as a wetting agent for the solids when introduced into a liquid environment. An additional advantage of gilsonite is that it acts as a defoamer to reduce or eliminate foaming that can be a significant impediment in LCM operations. Another advantage of gilsonite is that it acts as a spacer. A spacer is generally employed as a separate additive to encapsulate the LCM components to make them more effective at the loss zone. Another advantage of gilsonite is that it acts as a binding agent to facilitate formation and stability of the plug.

Viscosifiers of one preferred embodiment comprise generally natural compounds such as xanthan gum, and various synthetics known in the art, such as CMC. Xanthan gum, a natural nonionic polymer, can act as a viscosifier and a suspending agent. An additional advantage of xanthan gum is its effectiveness as a sealant.

The activator, or flocculant, retards hydration so the composition will dewater more rapidly. One type of preferred activator is represented by the inorganic hydroxide, lime.

The composition of the present invention may be introduced into the drilling mud right from the bag as a dry mix. The composition may be used up to approximately 10 pounds per barrel (ppb) in the circulation system to maintain seepage control and up to approximately 80 ppb directly into any fluids before there is significant effect on fluid rheological properties. The composition rapidly cures losses without time or temperature dependency.

The composition dewaters in the loss zone at a rapid rate to form a solid plug with no requirement of setting time, and without the need for a separate spacer, defoamer, accelerator, suspender, activator or retarder—a complete LCM in one bag. The composition is temperature stable to at least 450 degrees Fahrenheit and complies with the environmental LC50 standard. The composition forms a stable plug up to at least 1500 psi over hydrostatic pressure, whereas compositions comprising cross-linked polymers begin to fail at 100 psi. The composition may also be combined with a density agent, such as barite without loss of performance, or graphite as a lubricant.

In one preferred embodiment of the invention, the composition comprises of between approximately 46% and approximately 56% by weight of diatomaceous earth as a sealing or bridging component, between approximately 8% and approximately 18% by weight of walnut shells as a bridging component, between approximately 10% and approximately 20% by weight of wood flour as a sealing component, between approximately 10% and approximately 20% by weight of gilsonite as a wetting component, between approximately 1% to approximately 3% by weight of xanthan gum as a viscosifier, and between approximately 2% to approximately 6% by weight of lime as an activator.

In another preferred embodiment of the invention, the composition comprises of between approximately 50% and approximately 52% by weight of diatomaceous earth as a sealing or bridging component, between approximately 12% and approximately 14% by weight of walnut shells as a bridging component, between approximately 14% and approximately 16% by weight of wood flour as a sealing component, between approximately 14% and approximately 16% by weight of gilsonite as a wetting component, between approximately 1% to approximately 3% by weight of xanthan gum as a viscosifier, and between approximately 3% to approximately 5% by weight of lime as an activator.

In another preferred embodiment a lubricant, such as graphite, is incorporated into the composition to aid drilling performance.

In another preferred embodiment a density component, such as barite, is incorporated into the composition to aid location of the LCM to the thief zone.

The method of the invention comprises generally of introduction of the composition according to the invention directly into the drilling fluids in the conventional manner in dry form, or as a pill from a slugging pit. The lost circulation material descends to the zone determined by the operator to infiltrate the porous formation to significantly reduce or stop drilling fluid losses to the formation.

It is an object of the present invention to provide a lost circulation remediation composition comprising a broad particulate distribution of bridging and/or sealing components.

It is a further object of the present invention to provide a lost circulation composition that will both bridge and seal in a loss zone.

It is a further object of the present invention to provide an omnibase lost circulation composition for addition directly to any drilling fluids right from the bag, with no need for additional mixing equipment.

It is a further object of the present invention to provide an omnibase lost circulation composition for aqueous and/or organic environments without the need for additional additives such as a separate spacer, defoamer, accelerator, suspender, activator or retarder—a complete LCM in one bag.

It is a further object of the present invention to provide a lost circulation composition that dewaters at a rapid rate.

It is a further object of the present invention to provide a lost circulation composition that forms a plug stable at high temperatures and pressures.

It is a further object of the present invention to provide a lost circulation composition that is also effective as a sealing additive.

It is a further object of the present invention to provide a lost circulation composition that is not inhibited by contaminants, that no spacer is required when pumping the slurry, that it will not set inside the drill string, that the composition is not affected by temperature or pH, and that the composition is not time dependent for setting, nor does it require a separate activator or retarder.

BRIEF DESCRIPTION OF THE DRAWINGS

FIG. 1 is a graph with time in seconds on the X axis and milliliters of filtrate on the Y axis;

FIG. 2 is a graph with time in seconds on the X axis and milliliters of filtrate on the Y axis;

DESCRIPTION OF THE PREFERRED EMBODIMENT

Figure 3:
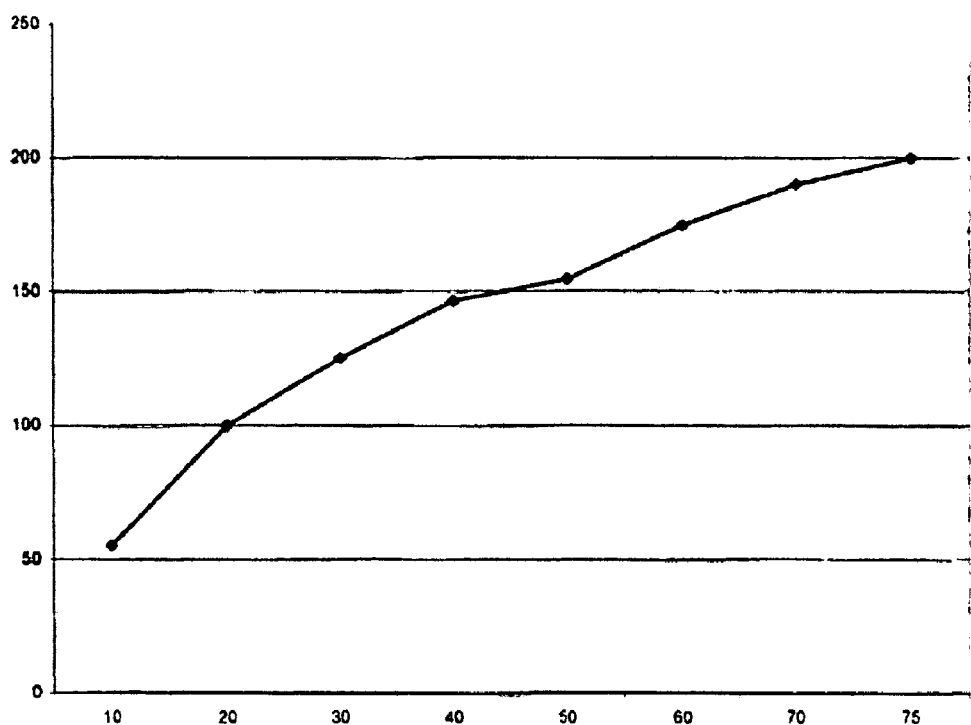
FIG. 3 is a graph with time in seconds on the X axis and milliliters of filtrate on the Y axis.

The following examples are illustrative of the compositions discussed above.

EXAMPLE 1

Components were mixed by weight in accord with the following amounts: diatomaceous earth —50-52%; walnut shells —12-14%; wood flour —14-16%; gilsonite —14-16%; xanthan gum —1-3%; and lime —3-5%.

This mixture was blended with water to 80 ppb and filtered at 100 psi room temperature through a 250 micron filter medium. The liquid phase was removed to a solid plug in one and one-half minutes, as shown in FIG. 1.

EXAMPLE 2

This mixture was blended with a non-aqueous fluid to 80 ppb and filtered at 100 psi room temperature through a 250 micron filter medium. The liquid phase was removed to a solid plug in one and one-half minutes, as shown in FIG. 2.

EXAMPLE 3

This mixture was blended with a 50% cut solution comprising seawater and base oil to 80 ppb and filtered at 100 psi room temperature through a 250 micron filter medium. The liquid phase was removed to a solid plug in one and one-half minutes, as shown in FIG. 3.

FIGS. 1, 2 and 3 show substantially similar results demonstrating the efficacy of the omnibase wetting agents of the preferred embodiment from aqueous base fluids, to cut solutions of various ratios, to synthetic base fluids.

EXAMPLE 4

A well was drilled to a depth of 10,105 feet and lost complete returns of oil mud. The operator suspected losses on the bottom as well as a faulty casing shoe. The LCM of the present invention was recommended to seal off the casing shoe as well as seal the possible thief zone at the bottom. The pill was successfully mixed, spotted in place, the drill string pulled above the pill, the annular closed and squeezed at targeted intervals. Downhole losses were cured after squeezing the pill and drilling resumed to a final depth of 11,034. Bottom hole temperature was 195 degrees F.

EXAMPLE 5

While drilling at 17,165 feet the well began having heavy losses of drilling mud. Picked up 20 off the bottom and started adding conventional LCM. After 1800 sacks and 24 hours the losses amounted to 2,633 barrels. Dissatisfied, the operator mixed and pumped 25 bbl of the LCM of the present invention (15 bbls diesel, 80 lb/bbl LCM, weighted to 16.4 lb/gal with barite). Spotted the pill at 17,145 feet then pulled to 17,055 and let hole remain static for 30 minutes. Added about 50 sacks of conventional LCMs and losses were under control to resume drilling.

EXAMPLE 6

While drilling at 610 feet the operator experienced severe losses. Two 60 bbl conventional pills and two cement plugs were tried without success. Prepared in water a 36 barrel pill of the LCM of the present invention and 7 bbls into the operation the operator regained full returns.

EXAMPLE 7

Full losses of drilling mud were experienced by 2400 meters. Pulled string out of hole. Mixed 50 sacks of the LCM of the present invention into base oil and pumped down hole and chased with drilling mud. The hydril closed and pressurized over time through a series of pressure increases and reductions until the pressure held steady at 675 kPa with no losses. Ran drill in easily until 1390 meters where hole became very tight. Reaming was required because product had left behind a very thick cake.

The composition and methods according to the present invention have multiple applications, several of which comprise open hole remedial and preventative lost circulation squeeze, cased hole squeeze for sealing perforations or casing leaks, as a plug to run in front of cement squeezes, as a plug to improve casing shoe integrity, as a lost circulation preventative material in the drilling mud for possible seepage losses, to name a few.

The composition and methods according to the present invention have multiple advantages, several of which comprise that the composition may be delivered to the site as a single remediation system in one bag, that it can be pumped using the pumps already on the rig to pump the drilling mud, that it can be pumped directly from the mud tank through the downhole tools, or be pre-mixed in aqueous or non-aqueous or a mixture thereof, before it is introduced into the bore, that the fluid environment in the well is not a limitation as the composition mixes in aqueous and non-aqueous fluids, and mixtures thereof, that it is not inhibited by contaminants, that no spacer is required when pumping the slurry, that it will not set inside the drill string, that the composition is not affected by temperature or pH, and that the composition is not time dependent for setting, nor does it require a separate activator or retarder.

Although several of the embodiments of the present invention have been described above, it will be readily apparent to those skilled in the art that many other modifications are possible without materially departing from the teachings of this invention. Accordingly, all such modifications are intended to fall within the scope of this invention, as defined in the following claims.

What is claimed is:

1. A lost circulation composition comprising a dry mixture of:
   between approximately 30% and approximately 95% by weight of at least one bridging component, at least one sealing component, or at least one bridging and one sealing component;
   between approximately 5% and approximately 25% by weight of omnibase wetting and binding component;
   between approximately 0.5% and approximately 4% by weight of viscosifier component, and
   between approximately 1% and approximately 8% by weight of activator component.

2. The composition of claim 1 comprising:
   between approximately 46% and approximately 56% by weight of diatomaceous earth;
   between approximately 8% and approximately 18% by weight of nut shells;
   between approximately 10% and approximately 20% by weight of wood flour;
   between approximately 10% and approximately 20% by weight of gilsonite;
   between approximately 1% and approximately 3% by weight of xanthan gum, and
   between approximately 2% and approximately 6% by weight of lime.

3. The composition of claim 1 comprising:
   between approximately 50% and approximately 52% by weight of diatomaceous earth;
   between approximately 12% and approximately 14% by weight of nut shells;
   between approximately 14% and approximately 16% by weight of wood flour;
   between approximately 14% and approximately 16% by weight of gilsonite;
   between approximately 1% and approximately 3% by weight of xanthan gum, and
   between approximately 3% and approximately 5% by weight of lime.

4. The composition of claim 1 comprising:
   51% by weight of diatomaceous earth;
   13% by weight of nut shells;
   15% by weight of wood flour;
   15% by weight of gilsonite;
   2% by weight of xanthan gum, and
   4% by weight of lime.

* * * * *